US012809521B2

(12) United States Patent
Onorato et al.

(10) Patent No.: US 12,809,521 B2
(45) **Date of Patent: *Nov. 24, 2026**

(54) COMMANDED DEVICE STATES FOR A MEMORY SYSTEM

(71) Applicant: Micron Technology, Inc., Boise, ID (US)

(72) Inventors: Marco Onorato, Villasanta (IT); Luca Porzio, Casalnuovo (IT); Roberto Izzi, Caserta (IT); Nadav Grosz, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/080,625

(22) Filed: Mar. 14, 2025

(65) Prior Publication Data

US 2025/0278194 A1 Sep. 4, 2025

Related U.S. Application Data

(63) Continuation of application No. 17/663,722, filed on May 17, 2022, now Pat. No. 12,260,088.

(51) Int. Cl.
*G06F 3/06* (2006.01)

(52) U.S. Cl.
CPC .......... *G06F 3/0611* (2013.01); *G06F 3/0619* (2013.01); *G06F 3/0631* (2013.01); *G06F 3/0659* (2013.01); *G06F 3/0679* (2013.01); *G06F 2212/7206* (2013.01)

(58) Field of Classification Search
CPC .... G06F 3/0611; G06F 3/0619; G06F 3/0631; G06F 3/0659; G06F 3/0679; G06F 2212/7206
See application file for complete search history.

(56) References Cited

U.S. PATENT DOCUMENTS

| | | | | |
|---|---|---|---|---|
| 9,128,845 | B2 | 9/2015 | Chang et al. | |
| 2009/0172246 | A1 | 7/2009 | Afriat | |
| 2015/0193302 | A1 | 7/2015 | Hyun et al. | |
| 2015/0301754 | A1 | 10/2015 | Kochar et al. | |
| 2016/0077968 | A1 | 3/2016 | Sela et al. | |
| 2016/0313928 | A1 | 10/2016 | Chun et al. | |
| 2016/0313943 | A1 | 10/2016 | Hashimoto et al. | |
| 2017/0272494 | A1* | 9/2017 | Huen .................... | G06F 3/0679 |

(Continued)

*Primary Examiner* — Kalpit Parikh
(74) *Attorney, Agent, or Firm* — Holland & Hart LLP

(57) ABSTRACT

Methods, systems, and devices for commanded device states for a memory system are described. For example, a memory system may be configured with different device states that are each associated with a respective allocation of resources (e.g., feature sets) for operations of the memory system. Resource allocations corresponding to the different device states may be associated with different combinations of memory management configurations, error control configurations, trim parameters, degrees of parallelism, or endurance configurations, among other parameters of the memory system, which may support different tradeoffs between performance characteristics of the memory system. A host system may be configured to evaluate various parameters of operating the host system, and to transmit commands for a memory system to enter a desired device state of the memory system.

20 Claims, 6 Drawing Sheets

(56) References Cited

U.S. PATENT DOCUMENTS

| | | | |
|---|---|---|---|
| 2020/0104056 | A1 | 4/2020 | Benisty et al. |
| 2020/0210335 | A1 | 7/2020 | Sundrani et al. |
| 2021/0304009 | A1 | 9/2021 | Bazarsky et al. |

* cited by examiner

COMMANDED DEVICE STATES FOR A MEMORY SYSTEM

CROSS REFERENCE

The present Application for patent is a continuation of U.S. patent application Ser. No. 17/663,722 by Onorato et al., entitled "COMMANDED DEVICE STATES FOR A MEMORY SYSTEM," filed May 17, 2022, assigned to the assignee hereof, and is expressly incorporated by reference in its entirety herein.

FIELD OF TECHNOLOGY

The following relates to one or more systems for memory, including commanded device states for a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A memory system may be associated with various resources that support operations of the memory system, such as processing resources, memory resources, power resources, resources that support parallel operations, or resources that support error control operations, among other examples. In some examples, a memory system may be configured with a static allocation of such resources to support the performance criteria of a particular design, such as a throughput criteria, a latency criteria, an error robustness criteria, or a power consumption criteria. However, a memory system may be coupled with a host system that is associated with one or more performance criteria that change over time, such as performance criteria that depend on application being supported by the host system or on an operating state of the host system. A host system may be aware of changes to such operating conditions, but may lack a capability to indicate changes to performance criteria to be supported by a memory system. Accordingly, an allocation of resources of the memory system may not be adaptable to changing operating conditions of the host system.

In accordance with examples as disclosed herein, a memory system may be configured with different device states that are each associated with a respective allocation of resources (e.g., a respective feature set) for operations of the memory system. Resource allocations corresponding to the different device states may be associated with different combinations of memory management configurations, error control configurations, trim parameters, degrees of parallelism, or endurance configurations, among other parameters of the memory system, which may support different tradeoffs between performance characteristics of the memory system. A host system may be configured to evaluate various parameters of operating the host system, and to transmit commands or requests for a memory system to enter a desired device state of the memory system. Accordingly, the described techniques support an adaptable allocation of resources of a memory system that is responsive to parameters of operating the host system, which provide an adaptable balance of throughput, latency, error control, degradation, power consumption, among other performance characteristics, during different operating conditions of a host system over time.

Figure 1:
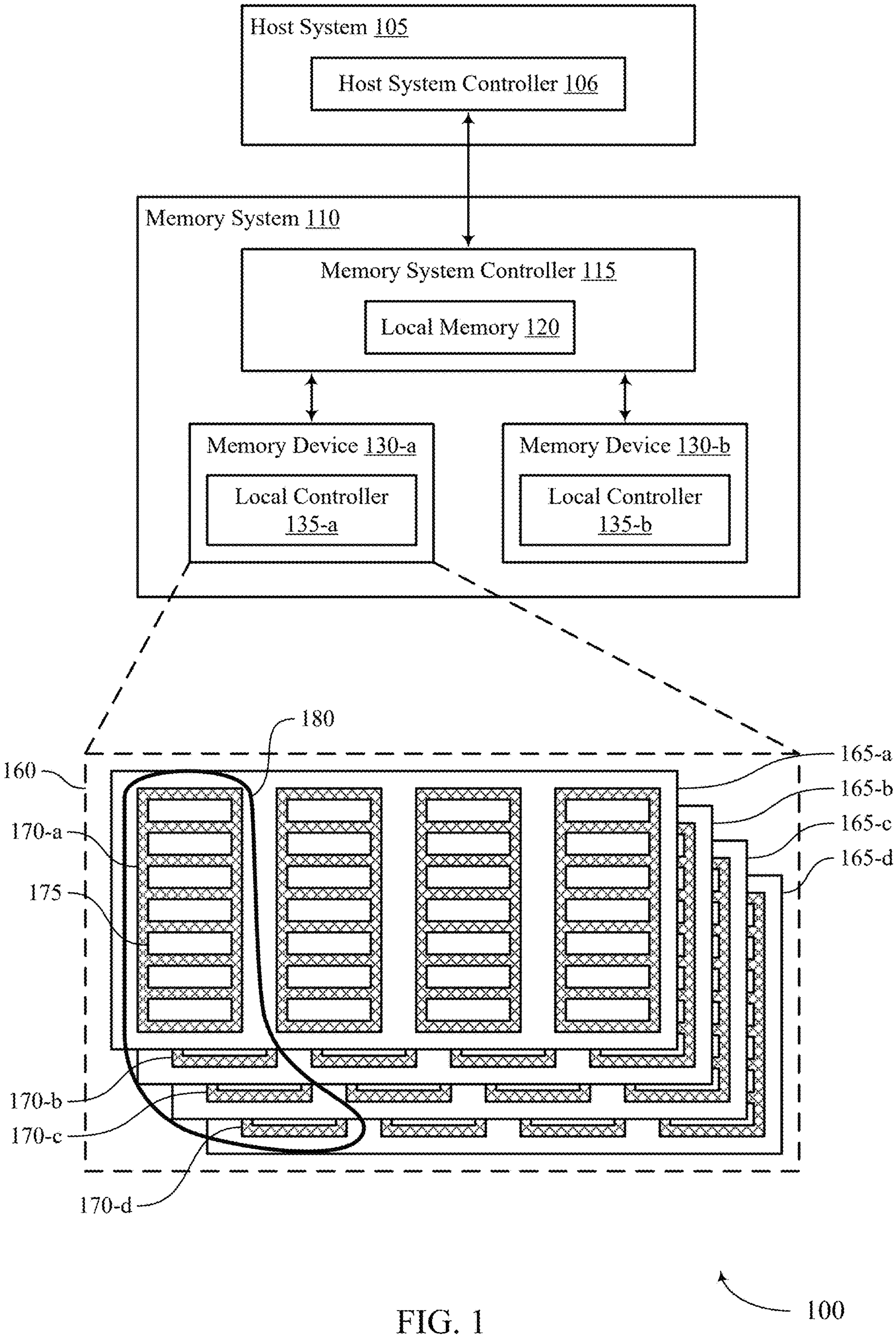
FIG. 1 illustrates an example of a system that supports commanded device states for a memory system in accordance with examples as disclosed herein.

Features of the disclosure are initially described in the context of systems and devices with reference to FIG. 1. Features of the disclosure are described in the context of a process flow with reference to FIG. 2. These and other features of the disclosure are further illustrated by and described in the context of block diagrams and a flowchart that relate to commanded device states for a memory system with reference to FIGS. 3-6.

FIG. 1 illustrates an example of a system 100 that supports commanded device states for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations (e.g., memory management operations) such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support commanded device states for a memory system. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

The memory system 110 may be associated with various resources that support operations of the memory system 110, such as processing resources (e.g., resources of a memory system controller 115, resources of one or more local controllers 135), memory resources (e.g., resources of local memory 120, resources of one or more memory devices 130), power resources, resources that support parallel operations, or resources that support error control operations, among other examples. In some examples, the memory system 110 may be configured with a static allocation of such resources to support the performance criteria, such as a throughput criteria, a latency criteria, an error robustness criteria, or a power consumption criteria for a particular design. However, the memory system 110 may be coupled with a host system 105 that is associated with one or more performance criteria that change over time, such as performance criteria that depend on application being supported by the host system 105 or on an operating state of the host system 105. The host system 105 (e.g., a host system controller 106) may be aware of changes to such operating conditions, but may lack a capability to indicate changes to performance criteria to be supported by the memory system 110. Accordingly, an allocation of resources of the memory system 110 may not be adaptable to changing operating conditions of the host system 105.

In accordance with examples as disclosed herein, the memory system 110 may be configured with different device states that are each associated with a respective allocation of resources (e.g., a respective feature set) for operations of the memory system 110. Resource allocations corresponding to the different device states may be associated with different combinations of memory management configurations, error control configurations, trim parameters, degrees of parallelism, or endurance configurations, among other parameters of the memory system 110, which may support different tradeoffs between performance characteristics of the memory system 110. The host system 105 (e.g., a host system controller 106) may be configured to evaluate various parameters of operating the host system 105, and to transmit commands for the memory system 110 to enter a desired device state of the memory system 110. Accordingly, the described techniques support an adaptable allocation of resources of the memory system 110 (e.g., by the memory system controller 115) that is responsive to parameters of operating the host system 105, which provide an adaptable balance of throughput, latency, error control, degradation, power consumption, among other performance characteristics, during different operating conditions of the host system 105 over time.

The system 100 may include any quantity of non-transitory computer readable media that support commanded device states for a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system

105, the memory system 110, or the memory device 130 to perform associated functions as described herein.

Figure 2:
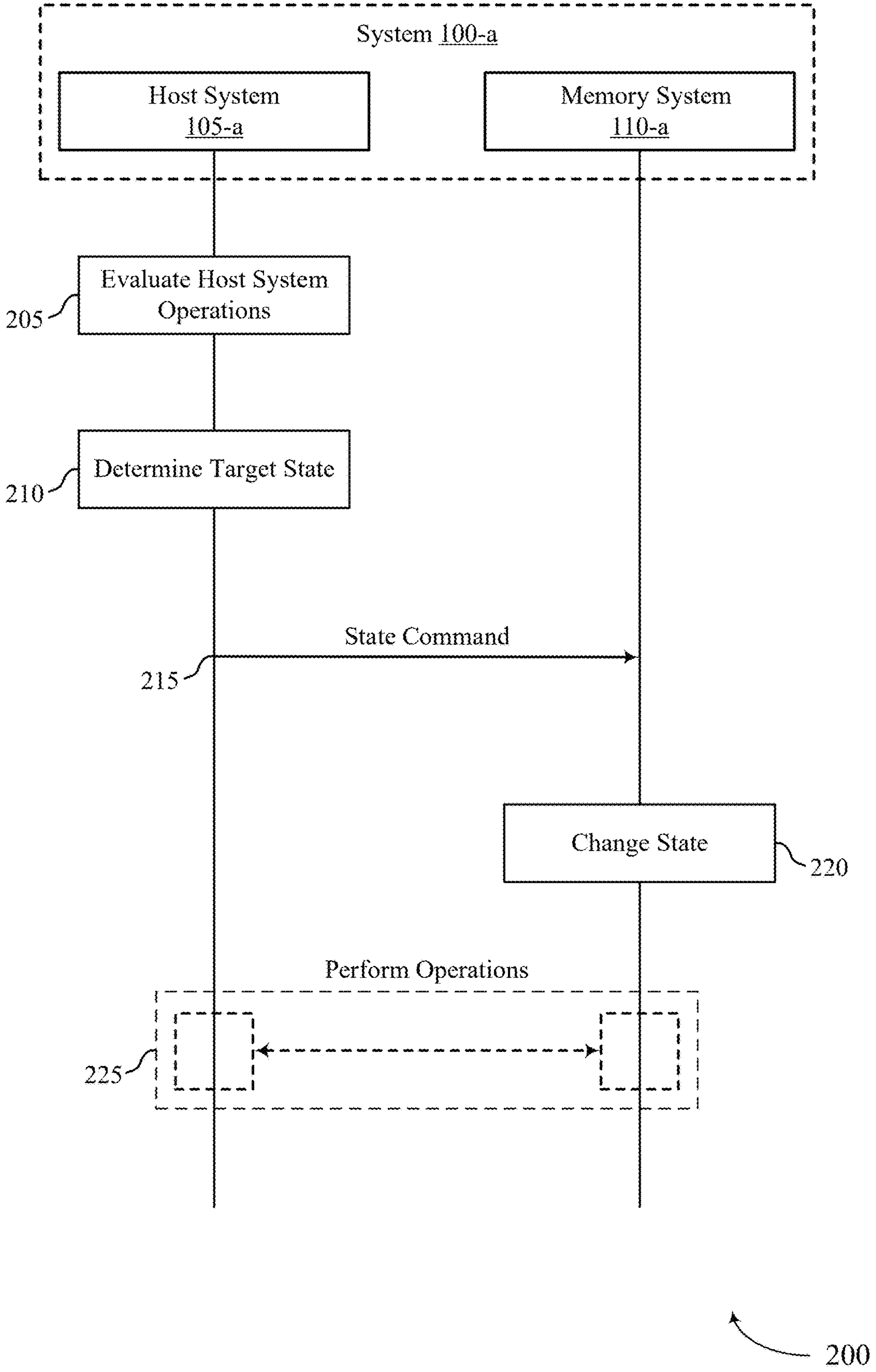
FIG. 2 illustrates an example of a process flow and related signaling that support commanded device states for a memory system in accordance with examples as disclosed herein.

FIG. 2 illustrates an example of a process flow 200 and related signaling that support commanded device states for a memory system in accordance with examples as disclosed herein. Operations of the process flow 200 may be performed by one or more components of a host system 105-*a* (e.g., a host system controller 106 of the host system 105-*a*) and a memory system 110-*a* (e.g., a memory system controller 115 of the memory system 110-*a*, a local controller 135 of the memory system 110-*a*, or a combination thereof) of a system 100-*a*, which may be examples of the respective components described with reference to FIG. 1. In some examples, the memory system 110-*a* may be an example of an MNAND system or other managed memory system, which may include operations of one or more memory devices 130 of the memory system 110-*a* that are managed by a memory system controller 115 of the memory system 110-*a*.

At 205, the process flow 200 may include evaluating operations of the host system 105-*a*. For example, the host system 105-*a* may determine one or more parameters of operating the host system 105-*a*, such as a throughput of information (e.g., read information, write information, or any combination thereof exchanged between the host system 105-*a* and the memory system 110-*a*), a latency tolerance (e.g., a target latency, an allowable latency, whether latency is relevant to a given operating condition), an error tolerance (e.g., whether data errors may be tolerated, a degree of error control expected from the memory system), a power condition, among other parameters associated with operating the host system 105-*a*.

In some examples, the evaluation of host system operations at 205 may involve measurements performed by the host system 105-*a*, such as a measurement of throughput (e.g., a commanded throughput associated with read commands or write commands, a status of an access command buffer), a measurement of power consumption (e.g., a measurement of current at a power supply voltage), a measurement of power availability or identification of a power source (e.g., whether the host system 105-*a* is operating on battery power or wired power, a measurement of a battery charge state), among other measurements. In some examples, such a determination may include an estimate or inference of parameters of operating the host system 105-*a*, such as an expected throughput, a desire to maximize throughput or minimize latency, a tolerance of access errors (e.g., an ability to support operations with a non-zero rate or write errors or read errors, such as content streaming or caching of transient information), or a tolerance of relatively low throughput or high latency that would support operating the memory system in a lower-performance state, among other parameters associated with operating the host system 105-*a*.

In various examples, the evaluation of host system operations at 205 may include a determination of parameters as an aggregate characterization of operations of the host system 105-*a*, or a determination of parameters for each of a set of one or more applications being supported by the host system 105-*a* (e.g., in accordance with determining one or more parameters of an application associated with operating the host system 105-*a*), or various combinations thereof. For example, the host system 105-*a* may identify support of an active application associated with relatively high throughput criteria, or relatively low latency tolerance criteria, or both. In some examples, the host system 105-*a* may prioritize evaluated parameters for certain applications (e.g., prioritizing an ability to satisfy operating criteria, such as throughput, latency, or error robustness, for high-priority applications), or the host system 105-*a* may evaluate parameters of operating the host system 105-*a* for meeting or exceeding a minimum operating criteria for one or more (e.g., all) of the applications being supported by the host system 105-*a* (e.g., to emphasize performance if relatively resource-intensive applications are being supported, to deemphasize performance if relatively few or relatively low-demand applications are being supported).

In some examples, an evaluation at 205 may include identifying an operating mode of the host system 105-*a*. For example, the system 100-*a* may be in an idle mode, in a maintenance mode, or be otherwise inactive, such as circumstances in which the system 100-*a* is a phone that is being charged (e.g., without user interaction or active applications), or in which the system 100-*a* is a vehicle in a parked or idle state (e.g., without being driven), among other examples. In some such examples, the corresponding host system 105-*a* may determine that a throughput parameter is low, or that a latency tolerance parameter is high (e.g., corresponding to a tolerance for relatively slower operations). Additionally, or alternatively, the system 100-*a* may be in a power conservation mode, such as circumstances in which the system 100-*a* is a phone, a vehicle, or another device operating with a battery having a charge state that is at or below some threshold (e.g., below 15% charge capacity). In some such examples, the corresponding host system 105-*a* may determine that a power condition parameter of operating the host system 105-*a* is low. In some other examples, operations of the system 100-*a* may involve high data rates to be written at high frequencies such as in high user interaction applications (e.g., gaming) or while performing a benchmark test (e.g., of the system 100-*a*, of the memory system 110-*a*). In such examples, the host system 105-*a* may determine parameters associated with a high-performance mode. For example, the host system 105-*a* may determine that an information throughput criteria is high, that a latency tolerance criteria is low, or that an error tolerance criteria is high, among other parameters of the host system 105-*a*.

At 210, the process flow 200 may include determining a target state (e.g., for the memory system 110-*a*), which may be based on one or more of the evaluations of host system operations at 205. Such a determination may include a selection (e.g., by the host system 105-*a*) from a plurality of device states supported by the memory system 110-*a*, where each device state may be associated with a respective allocation of resources of the memory system 110-*a* for prioritizing different performance criteria. For example, a relatively high-performance state of the memory system 110-*a* may be selected to support some applications of the host system 105-*a* (e.g., a user using a mobile phone, a car driving with an infotainment system turned on, a computer supporting a gaming application), whereas other applications may be associated with other (e.g., relatively lower-performance) criteria. In an illustrative example, for a mobile phone or other application with a display turned off, the host system 105-*a* may select a state of the memory system 110-*a* that corresponds to reduced power consumption even with less performance (e.g., lower throughput, higher latency). In another illustrative example, for a vehicle infotainment system that is operating in a vehicle with an engine turned off or otherwise not recharging batteries, the host system 105-*a* may select a relatively lower-performance state in which the memory system 110-*a* can consume less power. Accordingly, based on the activity of the host system 105-*a* (e.g., a command flow, an operating mode, evaluated parameters of operating the host system 105-*a*), the host system 105-*a* may determine (e.g., define, select), through an appropriate algorithm, a desired state for the memory system 110-*a*, which may correspond to a desired allocation of resources of the memory system 110-*a* for trading off various performance criteria.

In some cases, the host system 105-*a* may select a "Balanced" state (e.g., a generic state, an "all-purpose" state) as the target state for the memory system 110-*a*. In various examples, the Balanced state may be a default state of the memory system 110-*a*, or the host system 105-*a* may select the Balanced state to support relatively balanced operations of the system 100-*a*. In some examples, while configured in the Balanced state, among other states, the memory system 110-*a* may operate without making an implicit decision about the operating mode.

In some cases, the host system 105-*a* may select a "Performance" state as the target state for the memory system 110-*a*. In the Performance state, resources of the memory system 110-*a* may be allocated in a manner that prioritizes relatively high throughput and relatively low latency (e.g., to minimize or otherwise reduce read operation latency or write operation latency), or to maximize or otherwise increase operation throughput, which may be accompanied by relatively higher power consumption, relatively lower available storage capacity, or relatively higher degradation, among other tradeoffs. In some examples, the Performance state may be selected if the host system 105-*a* is running an application that requires relatively high (e.g., maximum) performance, such as a benchmark application or a gaming application.

In some cases, the host system 105-*a* may select a "Battery" state as the target state for the memory system 110-*a*. In the Battery state, resources of the memory system 110-*a* may be allocated in a manner that prioritizes relatively low power consumption, or relatively low peak current draw, which may be accompanied by relatively lower throughput, or relatively higher latency, among other tradeoffs. In some examples, the Battery state may be selected if the host system 105-*a* determines that the system 100-*a* is operating with a low battery level or otherwise reduced power supply. For example, if the system 100-*a* is powered by a battery (e.g., a mobile phone, a battery-powered vehicle) the Battery state may be selected if the battery reaches or falls below a threshold (e.g., 15% of capacity). Additionally, or alternatively, the Battery state may be selected if the system 100-*a* is operating using battery power rather than wired (e.g., plugged) power.

In some cases, the host system 105-*a* may select an "Endurance" state as the target state for the memory system 110-*a*. In the Endurance state, resources of the memory system 110-*a* may be allocated in a manner that prioritizes relatively few access operations on memory cells of the memory system 110-*a* (e.g., relatively few access operations on a memory device 130 that experiences memory cell degradation), relatively benign access operations, such (e.g., using trim parameters of one or more memory devices 130 that are associated with relatively low-magnitude access voltages or access currents), or an emphasis on wear-leveling across one or more memory devices 130. In some examples, the Endurance state may be selected if the host system 105-*a* identifies an inactive mode (e.g., a phone operating in nightly mode) that supports the memory system 110-*a* operating in a manner that prioritizes endurance, which be accompanied by relatively lower throughput, relatively higher latency, or relatively lower available capacity, among other tradeoffs.

In some cases, the host system 105-*a* may select a "Background" state as the target state for the memory system 110-*a*. In the Background state, resources of the memory system 110-*a* may be allocated in a manner that supports relatively greater availability for memory management operations, such as garbage collection, wear leveling, refresh, folding, and others, which may be accompanied by relatively lower throughput, relatively higher latency, or relatively higher power consumption, among other tradeoffs. In some examples, the Background state may be associated with the memory system 110-*a* supporting some threshold (e.g., minimum) set of performance criteria. The Background state may be selected if the host system 105-*a* determines that the system 100-*a* is operating with activity that is at or below some threshold (e.g., a low level activity), such that the host system 105-*a* can indicate that the memory system 110-*a* may prioritize internal operations (e.g., indicating an idle time or low-activity time). For example, the Background state may be selected if the system 100-*a* is not being actively used (e.g., is inactive) or actively supporting an application, or is operating in a maintenance mode, such as when a phone is in a wall-charge mode or when a vehicle is parked without a driver being present, among other examples.

In some cases, the host system 105-*a* may select an "Automatic" state as the target state for the memory system 110-*a*. In the Automatic state, the host system 105-*a* may leave resource allocation decisions to the memory system 110-*a*, which may involve the memory system 110-*a* selecting a device state (e.g., the Balanced state, the Performance state, the Battery state, the Endurance state, the Background state) based on characteristics of the memory system 110-*a*. In other words, the memory system 110-*a* may infer performance criteria that are to be supported by the memory system 110-*a*, and may select a device state accordingly (e.g., based on heuristic algorithms internal to the memory system 110-*a*, without a specific command or request of a device state from the host system 105-*a*).

Thus, in accordance with these and other examples, at 210, the host system 105-*a* may determine a device state for the memory system 110-*a*, or may signal a permissive state in which the memory system 110-*a* itself may select a device state, which may support various techniques for dynamic allocations of resources at the memory system 110-*a*.

At 215, the process flow 200 may include a transmission of a state command. For example, the host system 105-*a* may transmit a command for the memory system 110-*a* to enter the target state determined at 210 (e.g., a device state of the memory system 110-*a*, a permissive state in which the memory system 110-*a* may determine a device state or allocation of resources). In some other examples, the signaling of 215 may be associated with a request from the host system 105-*a* for the memory system 110-*a* to enter a desired device state, rather than a command, which may be accepted or denied by the memory system 110-*a*.

In some cases, to support the signaling of the command of 215, the memory system 110-*a* may implement a register associated with the device states of the memory system 110-*a*, such as a descriptor register. For example, to signal the command of 215, the host system 105-*a* may transmit a command to the memory system 110-*a* to write an indication of the device state in the register of the memory system 110-*a*. Table 1 illustrates an example of such a register, where a value of a one byte descriptor (e.g., bCurrDevState) may be associated with a device state of the memory system 110-*a*.

TABLE 1

| Register Values and Corresponding Device States | |
|---|---|
| Register Value | Device State |
| 0 × 0 | Balanced |
| 0 × 1 | Performance |
| 0 × 2 | Battery |
| 0 × 3 | Endurance |
| 0 × 4 | Background |
| 0 × 5 | Automatic |

In the example of system 100-*a*, such a register, or value thereof, may also be used by the memory system 110-*a* to indicate a device state status. For example, the memory system 110-*a* may write a value to such a register to indicate whether the memory system 110-*a* has entered a commanded device state, or to indicate a device state selected by the memory system (e.g., when commanded or requested to operate in an Automatic state).

At 220, the process flow 200 may include changing a state of the memory system 110-*a*. For example, based on receiving the command of 215, the memory system 110-*a* may set one or more parameters of the memory system 110-*a* that correspond to the allocation of resources associated with the commanded device state. In some examples, the memory system 110-*a* may change state based on reading a register value (e.g., a value of a descriptor register, a register value of Table 1) and setting memory operation parameters associated with the register. The setting of parameters at 220 may be associated with establishing a resource allocation at the memory system 110-*a* that supports the prioritized performance criteria of the device state commanded or requested by the host system 105-*a*.

In some examples, the operations of 220 may include the memory system 110-*a* setting a quantity of logic levels to be stored in memory cells of the memory system. For example, a relatively lower quantity of logic levels (e.g., two levels, an SLC configuration) may be associated with relatively lower latency (e.g., due to relatively faster read or write operations, due to relatively fewer reference voltages for read operations) or relatively lower memory cell deterioration (e.g., higher endurance, due to relatively lower-magnitude access biasing), among other characteristics associated with relatively fewer logic levels per memory cell. Alternatively, a relatively higher quantity of logic levels (e.g., more than two levels, in a multiple-level cell configuration), may be associated with relatively higher storage capacity (e.g., due to storing more bits per memory cells), or relatively fewer memory management operations (e.g., due to storing information more compactly), among other characteristics associated with relatively greater logic levels per memory cell.

In some examples, the operations of 220 may include the memory system 110-*a* setting a proportion of volatile memory (e.g., of local memory 120, of a memory device 130, an SRAM array) for supporting operations of the memory system 110-*a*. For example, enabling (e.g., powering, activating) a relatively higher proportion of volatile memory, such as all of a volatile memory array, may support higher throughput or lower latency (e.g., due to increased caching, due to increased L2P table availability), whereas enabling a relatively lower proportion of volatile memory (e.g., disabling at least a portion of volatile memory, disabling one or more power domains of volatile memory) may be associated with relatively reduced power consumption, among other characteristics associated with enabling different proportions of a volatile memory of the memory system 110-*a*.

In some examples, the operations of 220 may include the memory system 110-*a* setting a degree of parallelism (e.g., a quantity of data paths operating in concurrently, a quantity of memory devices 130 or portions thereof operating concurrently). For example, enabling a higher degree of parallelism may be support higher throughput or reduced latency (e.g., due to supporting more access operations in parallel), whereas a relatively lower degree of parallelism may support relatively lower power consumption or relatively higher availability for memory management operations (e.g., garbage collection, wear leveling, refresh), among other characteristics associated with setting different degrees of parallelism.

In some examples, the operations of 220 may include the memory system 110-*a* setting an error control configuration (e.g., whether error control functions are operational, a quantity bits of error detection, a quantity of bits of error correction, an activation or deactivation of a redundant array of independent NAND (RAIN)). For example, enabling aspects of an error control configuration may be associated with relatively fewer data errors (e.g., due to performing error control operations, due to performing error control operations in accordance with a higher quantity of error bits), whereas disabling aspects of an error control configuration may be associated with higher throughput or reduced latency, among other characteristics associated with different error control configuration settings.

In some examples, the operations of 220 may include the memory system 110-*a* setting a memory management configuration (e.g., whether memory management functions are operational or inhibited, a rate at which memory management functions are performed). For example, disabling or reducing a rate for memory management operations may be associated with relatively higher throughput or reduced latency, whereas enabling or increasing a rate of memory management operations may be associated with greater available capacity (e.g., due to garbage collection operations), improved endurance performance (e.g., due to wear leveling), or improved data integrity (e.g., due to refresh operations), among other characteristics associated with different memory management configuration settings.

In some examples, the operations of 220 may include the memory system 110-*a* setting one or more trim parameters (e.g., clock timing or scaling, access operation timing, read or write signal magnitudes, burst configurations). For example, some trim parameter settings may be associated with relatively higher throughput or reduced latency (e.g., due to faster access operation timing) or relatively improved data retention (e.g., due to higher write signal magnitudes), whereas some other trim parameter settings may be associated with relatively higher endurance performance or relatively lower power consumption (e.g., due to relatively lower access signal magnitudes, due to relatively slower access operation timing), among other characteristics associated with different trim parameters.

In some examples, the operations of 220 may include the memory system 110-*a* setting wear-out thresholds (e.g., parameters for managing endurance of a memory device 130, parameters for selecting which portions of a memory device to access). For example, setting relatively high thresholds for wear-out considerations may be associated with relatively high throughput or low latency (e.g., due to increasing a proportion of memory cells available for write operations), whereas setting relatively low thresholds for wear-out considerations may be associated with improved endurance performance (e.g., due to balancing wear across a memory array, due to performing memory management to mitigate degradation), among other characteristics associated with different wear-out thresholds.

Thus, according to these and other examples, the memory system 110-*a* may configure aspects of a resource allocation of the memory system 110-*a*, in response to signaling from the host system 105-*a*, which may support performance characteristics that are adaptable to different operating conditions of the host system 105-*a*.

In some cases, the operations of 220 may include the memory system 110-*a* setting a combination of parameters to support a resource allocation in accordance with the Balanced state (e.g., normal operation). For example, the Balanced state may be associated with moderate or default settings for parameters such as a quantity of logic levels per cell, a proportion of enabled volatile memory, a degree of parallelism (e.g., operating up to three memory dies in parallel), an error control configuration (e.g., enabling error control operations in a default configuration), a memory management configuration, or trim parameters, or various combinations thereof.

In some cases, the operations of 220 may include the memory system 110-*a* setting a combination of parameters to support a resource allocation in accordance with the Performance state, in which the memory system 110-*a* may be configured to minimize read or write operation latency and maximize operation throughput. In some examples, such operations may include configuring the memory system 110-*a* with relatively high clock scaling (e.g., overclocking), or relatively fast trim parameters, or any combination thereof. Additionally, or alternatively, such operations may include the memory system 110-*a* allocating all available memory of a local memory 120 (e.g., a full proportion of an SRAM array) to store L2P tables, which may reduce an exchange of L2P table information between a local memory 120 and a memory device 130. Additionally, or alternatively, such operations may include the memory system 110-*a* disabling or reducing error control functionality (e.g., error correction code (ECC) functionality) or redundancy techniques such as redundant array of independent NAND (RAIN) protection, which may increase the possibility of read errors or write errors, but such errors may be tolerable in the context of supporting higher throughput or reduced latency (e.g., for conditions in which data may be likely to be overwritten, such as during benchmark or streaming application).

Further, for operations in the Performance state, the memory system 110-*a* may additionally, or alternatively, enable writing to SLC buffers rather than multiple-level cell buffers (e.g., reducing a quantity of logic levels associated with a buffer area of a memory device 130), or otherwise set at least a portion of a memory device to operate in accordance with relatively fewer logic states per memory cell (e.g., where the memory system 110-*a* may operate proactively in a write-booster configuration). Additionally, or alternatively, the memory system 110-*a* may set a relatively high degree of parallelism (e.g., full parallelism), such as enabling parallel access operations on up to 8 memory dies (e.g., of one or more memory devices 130). Additionally, or alternatively, the memory system may set a relatively high wear-out threshold, which may be associated with accessing memory cells having relatively high levels of degradation, to support the increased throughput and reduced latency. In some examples, a memory management configuration in the Performance state may be set such that operations are performed upon request from the host system 105-*a*, but the memory system 110-*a* may not, itself, initiate such operations without such a request. In some cases, the memory system 110-*a* may be configured to program content into the memory devices 130 in large bursts of data to reduce latency of page programming.

In some cases, the operations of 220 may include the memory system 110-*a* setting a combination of parameters to support a resource allocation in accordance with the Battery state, in which the memory system 110-*a* may be configured to minimize power consumption or limit power-consuming operations. In some examples, such operations may include setting a relatively low degree of parallelism (e.g., enabling access of a single memory die at a time), or otherwise reducing a rate of access operations (e.g., implementing relatively slower trim parameters), which may avoid relatively high currents. Additionally, or alternatively, such operations may include the memory system 110-*a* disabling at least a portion of a local memory 120 (e.g., switching off internal power domains of a local memory 120, switching off some SRAM banks). Additionally, or alternatively, such operations may include the memory system 110-*a* disabling or reducing a rate of housekeeping operations to a minimum configuration of operations for the system 100-*a* to function.

In some cases, the operations of 220 may include the memory system 110-*a* setting a combination of parameters to support a resource allocation in accordance with the Endurance state, in which the memory system 110-*a* may be configured to maximize endurance of one or more memory devices 130, or memory cells thereof. In various examples, such operations may include prioritizing wear-leveling, reducing memory cell access (e.g., disabling or reducing a rate of at least some memory management operations such as garbage collection), setting relatively low wear-out thresholds (e.g., to prioritize access of memory cells with relatively low degradation), or setting relatively benign trim parameters (e.g., associated with relatively low degradation, relatively low-magnitude cell biasing), among other characteristics. In some examples, while operating in the Endurance state, the memory system 110-*a* may evaluate whether to honor SLC write requests from the host system 105-*a* (e.g., whether to honor a write-boost command or request), which may depend on a wear-out status of an SLC block of a memory device 130 and a wear-out threshold of the Endurance state. In some cases, performance of the memory system 110-*a* (e.g., related to throughput, latency) may be reduced to support evaluations by a memory system controller 115, such as determinations of which memory cells to access for a given operation, or evaluations of utilization patterns (e.g., data written together, garbage data collected together), among other operations to support improved endurance.

In some cases, while operating in the Endurance state, the memory system 110-*a* may be configured to program content into the memory devices 130 using small peaks of current in order to increase reliability and endurance of the programmed content (e.g., for an application that stores data for a relatively long period. Additionally, or alternatively, the memory system 110-*a* may configure garbage collection to erase older memory blocks or memory blocks otherwise associated with a higher probability of errors. Additionally, or alternatively, the memory system 110-*a* may write similar content to different memory blocks so that the memory blocks may be refreshed at the same time due to similar lifespans.

In some cases, the operations of 220 may include the memory system 110-*a* setting a combination of parameters to support a resource allocation in accordance with the Background state, in which the memory system 110-*a* may be configured to support some threshold level of performance (e.g., a minimum level of performance) and leverage idle time to perform housekeeping operations. In some examples, such operations may include configuring the memory system 110-*a* to perform memory management operations as soon as idle time is available (e.g., to perform memory management operations that may have been inhibited due to intense user activity or a configuration in the Performance state). Additionally, or alternatively, such operations may include configuring the memory system 110-*a* to perform maintenance tasks (e.g., folding, garbage collection, refresh, wear leveling) more proactively (e.g., in accordance with a lower threshold, performing maintenance tasks even if a threshold of another device state has not been reached).

In some cases, the operations of 220 may include the memory system 110-*a* setting a combination of parameters to support a resource allocation in accordance with the Automatic state, in which the memory system 110-*a* may be configured to internally determine a resource allocation (e.g., a device state or other resource allocation) based on internal heuristic algorithms. In some examples, such operations may include the memory system 110-*a* determining, from operations supported by the memory system 110-*a*, to prioritize high throughput and low latency, or to prioritize low power consumption (e.g., in response to an evaluation of a power condition), or to prioritize endurance (e.g., in response to an evaluation of degradation conditions) among other performance criteria, and configure a resource allocation accordingly. In some examples, the memory system 110-*a* may indicate a device state it has selected, which may include writing a register value associated with the selected state that can be read by the host system 105-*a*.

At 225, the process flow 200 may include performing operations of the memory system 110-*a* in accordance with the commanded device state (e.g., in accordance with a selected or commanded allocation of resources of the memory system 110-*a*). For example, the host system 105-*a* may issue commands (e.g., write commands, read commands, memory management commands), to which the memory system 110-*a* may respond by performing operations in accordance with the allocation of resources established at 220. Additionally, or alternatively, the memory system 110-*a* may perform internal operations (e.g., memory management operations), among other operations in accordance with such an allocation of resources. In some examples, the operations of 225 may include the memory system 110-*a* transmitting (e.g., to the host system 105-*a*) an indication that the memory system has entered the device state.

Figure 3:
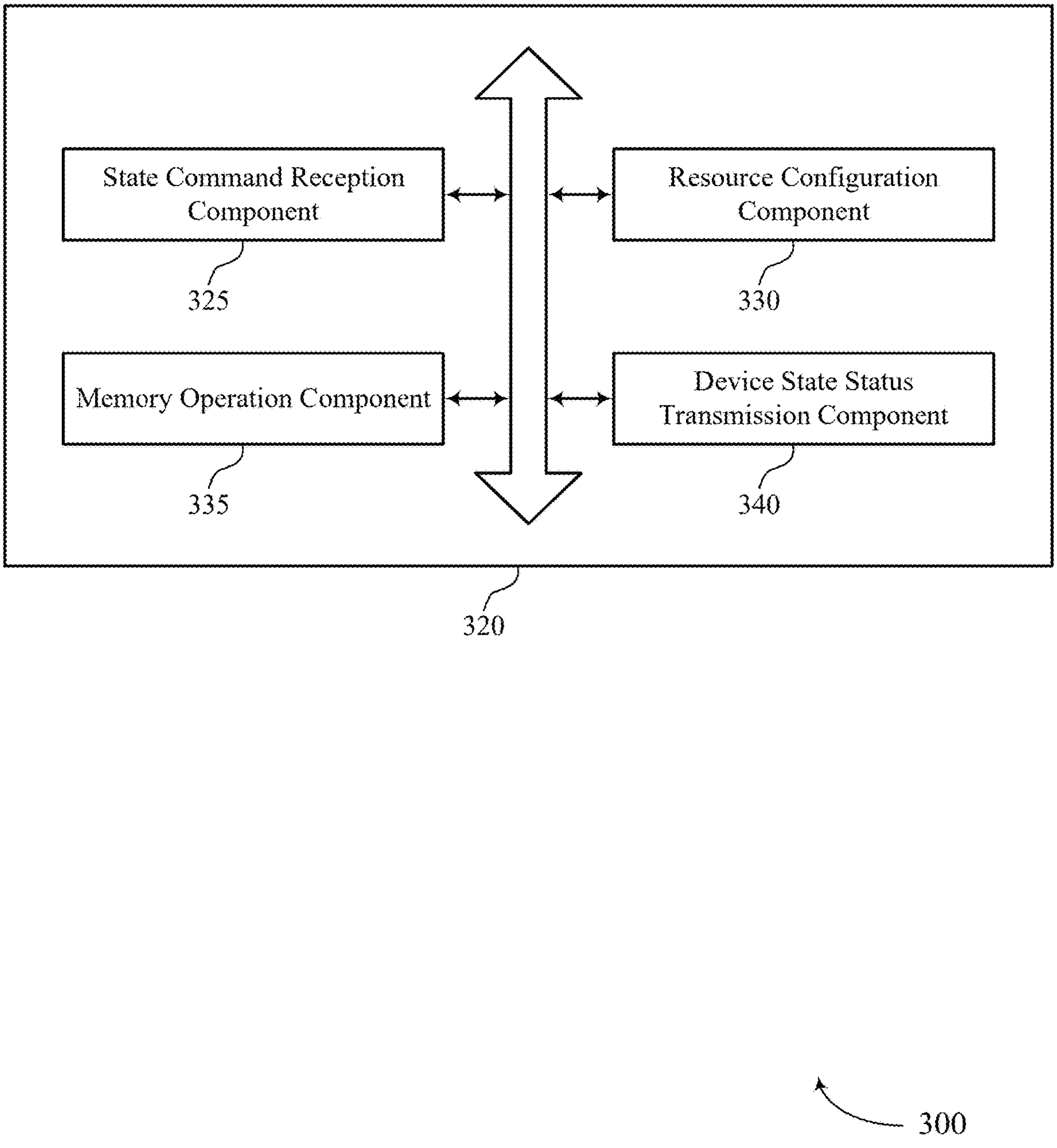
FIG. 3 shows a block diagram of a memory system that supports commanded device states for a memory system in accordance with examples as disclosed herein.

FIG. 3 shows a block diagram 300 of a memory system 320 that supports commanded device states for a memory system in accordance with examples as disclosed herein. The memory system 320 may be an example of aspects of a memory system as described with reference to FIGS. 1 and 2. The memory system 320, or various components thereof, may be an example of means for performing various aspects of commanded device states for a memory system as described herein. For example, the memory system 320 may include a state command reception component 325, a resource configuration component 330, a memory operation component 335, a device state status transmission component 340, or any combination thereof. Each of these components may communicate, directly or indirectly, with one another (e.g., via one or more buses).

The state command reception component 325 may be configured as or otherwise support a means for receiving a command to operate in a device state of a plurality of device states of the memory system 320, where each device state of the plurality of device states is associated with a respective allocation of resources for operations of the memory system 320. The resource configuration component 330 may be configured as or otherwise support a means for setting one or more parameters of the memory system 320 corresponding to the respective allocation of resources associated with the device state based at least in part on receiving the command. The memory operation component 335 may be configured as or otherwise support a means for performing the operations of the memory system 320 in accordance with the respective allocation of resources associated with the device state based at least in part on setting the one or more parameters.

In some examples, to support setting the one or more parameters of the memory system 320, the resource configuration component 330 may be configured as or otherwise support a means for setting an error control configuration, corresponding to the respective allocation of resources associated with the device state, for operating one or more memory devices of the memory system 320 based at least in part on receiving the command.

In some examples, to support setting the one or more parameters of the memory system 320, the resource configuration component 330 may be configured as or otherwise support a means for setting a trim parameter, corresponding to the respective allocation of resources associated with the device state, for operating one or more memory devices of the memory system 320 based at least in part on receiving the command.

In some examples, to support setting the one or more parameters of the memory system 320, the resource configuration component 330 may be configured as or otherwise support a means for setting a degree of parallelism, corresponding to the respective allocation of resources associated with the device state, for operating one or more memory devices of the memory system 320 based at least in part on receiving the command.

In some examples, to support setting the one or more parameters of the memory system 320, the resource configuration component 330 may be configured as or otherwise support a means for setting a memory management configuration, corresponding to the respective allocation of resources associated with the device state, for operating one or more memory devices of the memory system 320 based at least in part on receiving the command.

In some examples, to support setting the one or more parameters of the memory system 320, the resource configuration component 330 may be configured as or otherwise support a means for setting a wear-out threshold, corresponding to the respective allocation of resources associated with the device state, for operating one or more memory devices of the memory system 320 based at least in part on receiving the command.

In some examples, to support setting the one or more parameters of the memory system 320, the resource configuration component 330 may be configured as or otherwise support a means for setting a quantity of logic levels, corresponding to the respective allocation of resources associated with the device state, for operating memory cells of one or more memory devices of the memory system 320 based at least in part on receiving the command.

In some examples, to support setting the one or more parameters of the memory system 320, the resource configuration component 330 may be configured as or otherwise support a means for enabling a proportion, corresponding to the respective allocation of resources associated with the device state, of a volatile memory device of the memory system 320 for supporting operations of the memory system 320 based at least in part on receiving the command.

In some examples, the device state status transmission component 340 may be configured as or otherwise support a means for transmitting an indication that the memory system 320 has entered the device state.

In some examples, to support receiving the command to enter the device state, the state command reception component 325 may be configured as or otherwise support a means for receiving a command (e.g., from a host system coupled with the memory system 320) to write an indication of the device state in a register of the memory system 320.

Figure 4:
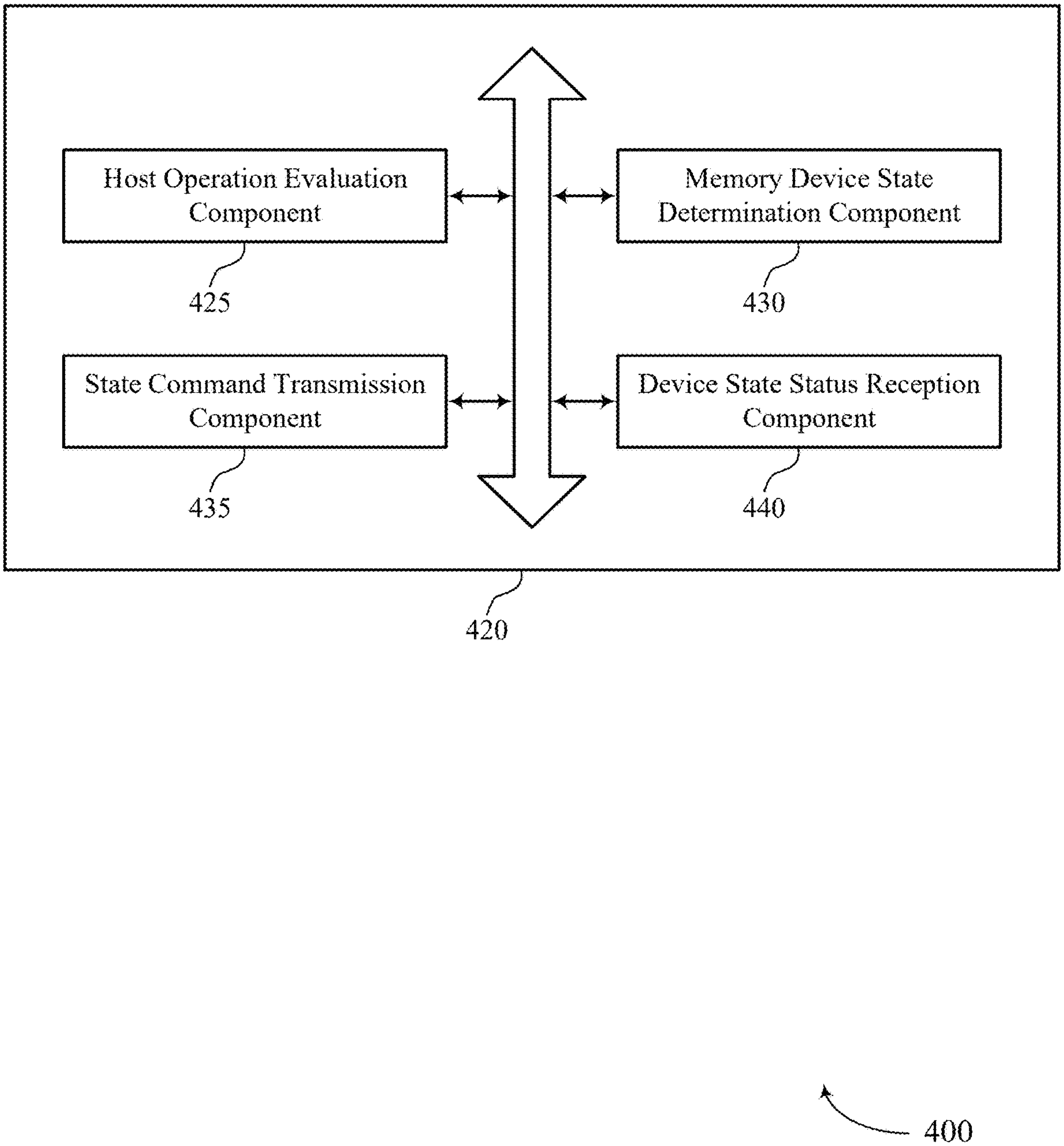
FIG. 4 shows a block diagram of a host system that supports commanded device states for a memory system in accordance with examples as disclosed herein.

FIG. 4 shows a block diagram 400 of a host system 420 that supports commanded device states for a memory system in accordance with examples as disclosed herein. The host system 420 may be an example of aspects of a host system as described with reference to FIGS. 1 through 2. The host system 420, or various components thereof, may be an example of means for performing various aspects of commanded device states for a memory system as described herein. For example, the host system 420 may include a host operation evaluation component 425, a memory device state determination component 430, a state command transmission component 435, a device state status reception component 440, or any combination thereof. Each of these components may communicate, directly or indirectly, with one another (e.g., via one or more buses).

The host operation evaluation component 425 may be configured as or otherwise support a means for determining one or more parameters of operating the host system 420. The memory device state determination component 430 may be configured as or otherwise support a means for determining a device state of a plurality of device states of a memory system based at least in part on the one or more parameters of operating the host system 420, where each device state of the plurality of device states is associated with a respective allocation of resources for operations of the memory system. The state command transmission component 435 may be configured as or otherwise support a means for transmitting a command for the memory system to enter the determined device state, where the command is associated with the memory system setting one or more parameters of the memory system corresponding to the respective allocation of resources associated with the determined device state.

In some examples, to support determining the one or more parameters of operating the host system 420, the host operation evaluation component 425 may be configured as or otherwise support a means for determining a throughput of information associated with operating the host system 420.

In some examples, to support determining the one or more parameters of operating the host system 420, the host operation evaluation component 425 may be configured as or otherwise support a means for determining a latency tolerance associated with operating the host system 420.

In some examples, to support determining the one or more parameters of operating the host system 420, the host operation evaluation component 425 may be configured as or otherwise support a means for determining an error tolerance associated with operating the host system 420.

In some examples, to support determining the one or more parameters of operating the host system 420, the host operation evaluation component 425 may be configured as or otherwise support a means for determining a power condition associated with operating the host system 420.

In some examples, to support determining the one or more parameters of operating the host system 420, the host operation evaluation component 425 may be configured as or otherwise support a means for determining a parameter of an application associated with operating the host system 420.

In some examples, the device state status reception component 440 may be configured as or otherwise support a means for receiving an indication that the memory system has entered the device state.

In some examples, to support transmitting the command to enter the device state, the state command transmission component 435 may be configured as or otherwise support a means for transmitting a command to the memory system to write an indication of the device state in a register of the memory system.

Figure 5:
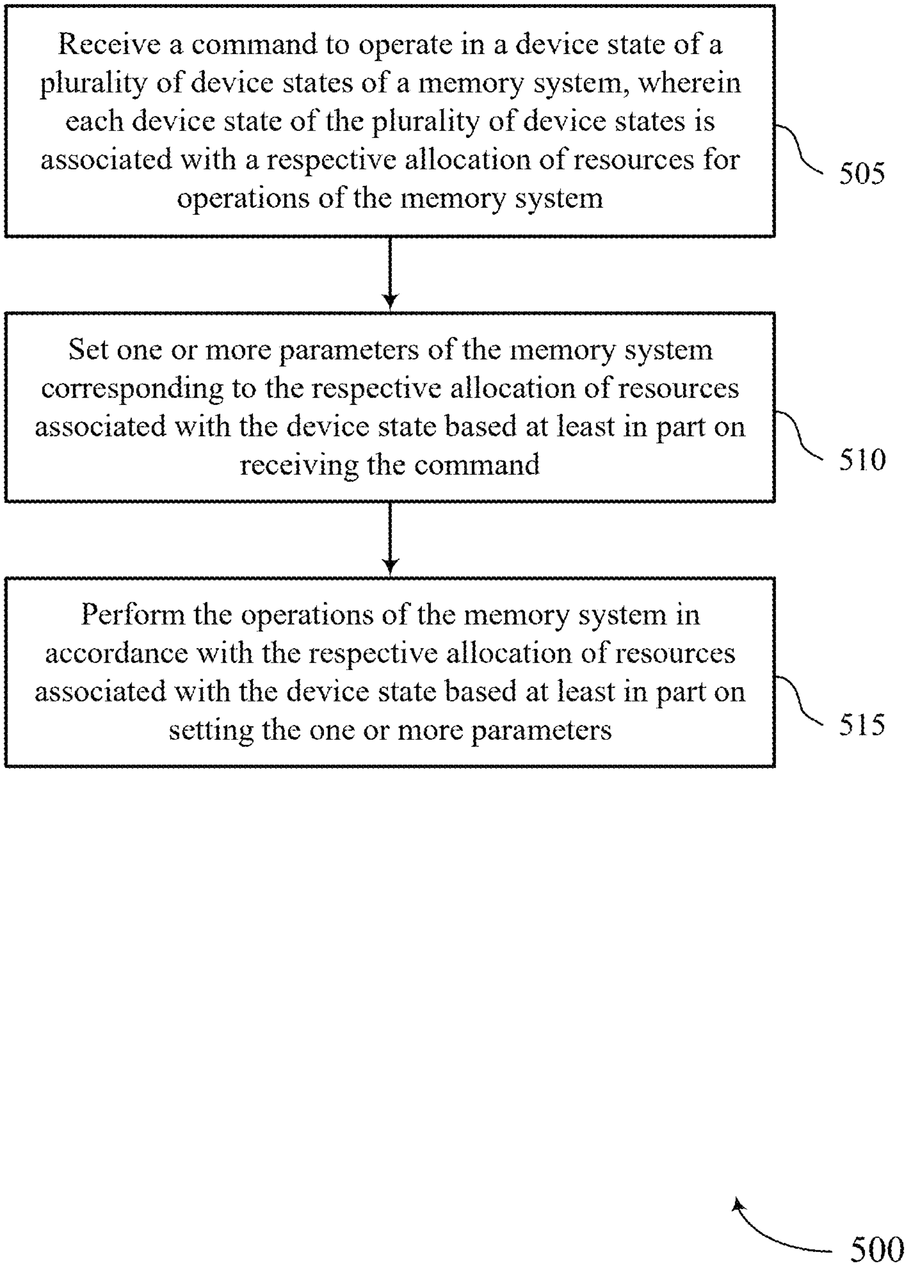
FIGS. 5 and 6 show flowcharts illustrating a method or methods that support commanded device states for a memory system in accordance with examples as disclosed herein.

FIG. 5 shows a flowchart illustrating a method 500 that supports commanded device states for a memory system in accordance with examples as disclosed herein. The operations of method 500 may be implemented by a memory system or its components as described herein. For example, the operations of method 500 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 505, the method may include receiving (e.g., at a memory system) a command to operate in a device state of a plurality of device states of the memory system, where each device state of the plurality of device states is associated with a respective allocation of resources for operations of the memory system. The operations of 505 may be performed in accordance with examples as disclosed herein. In some examples, aspects of the operations of 505 may be performed by a state command reception component 325 as described with reference to FIG. 3.

At 510, the method may include setting one or more parameters of the memory system corresponding to the respective allocation of resources associated with the device state based at least in part on receiving the command. The operations of 510 may be performed in accordance with examples as disclosed herein. In some examples, aspects of the operations of 510 may be performed by a resource configuration component 330 as described with reference to FIG. 3.

At 515, the method may include performing the operations of the memory system in accordance with the respective allocation of resources associated with the device state based at least in part on setting the one or more parameters. The operations of 515 may be performed in accordance with examples as disclosed herein. In some examples, aspects of the operations of 515 may be performed by a memory operation component 335 as described with reference to FIG. 3.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving (e.g., at a memory system) a command to operate in a device state of a plurality of device states of the memory system, where each device state of the plurality of device states is associated with a respective allocation of resources for operations of the memory system; setting one or more parameters of the memory system corresponding to the respective allocation of resources associated with the device state based at least in part on receiving the command; and performing the operations of the memory system in accordance with the respective allocation of resources associated with the device state based at least in part on setting the one or more parameters.

Aspect 2: The method, apparatus, or non-transitory computer-readable medium of aspect 1 where setting the one or more parameters of the memory system includes operations, features, circuitry, logic, means, or instructions, or any combination thereof for setting an error control configuration, corresponding to the respective allocation of resources associated with the device state, for operating one or more memory devices of the memory system based at least in part on receiving the command.

Aspect 3: The method, apparatus, or non-transitory computer-readable medium of any of aspects 1 through 2 where setting the one or more parameters of the memory system includes operations, features, circuitry, logic, means, or instructions, or any combination thereof for setting a trim parameter, corresponding to the respective allocation of resources associated with the device state, for operating one or more memory devices of the memory system based at least in part on receiving the command.

Aspect 4: The method, apparatus, or non-transitory computer-readable medium of any of aspects 1 through 3 where setting the one or more parameters of the memory system includes operations, features, circuitry, logic, means, or instructions, or any combination thereof for setting a degree of parallelism, corresponding to the respective allocation of resources associated with the device state, for operating one or more memory devices of the memory system based at least in part on receiving the command.

Aspect 5: The method, apparatus, or non-transitory computer-readable medium of any of aspects 1 through 4 where setting the one or more parameters of the memory system includes operations, features, circuitry, logic, means, or instructions, or any combination thereof for setting a memory management configuration, corresponding to the respective allocation of resources associated with the device state, for operating one or more memory devices of the memory system based at least in part on receiving the command.

Aspect 6: The method, apparatus, or non-transitory computer-readable medium of any of aspects 1 through 5 where setting the one or more parameters of the memory system includes operations, features, circuitry, logic, means, or instructions, or any combination thereof for setting a wear-out threshold, corresponding to the respective allocation of resources associated with the device state, for operating one or more memory devices of the memory system based at least in part on receiving the command.

Aspect 7: The method, apparatus, or non-transitory computer-readable medium of any of aspects 1 through 6 where setting the one or more parameters of the memory system includes operations, features, circuitry, logic, means, or instructions, or any combination thereof for setting a quantity of logic levels, corresponding to the respective allocation of resources associated with the device state, for operating memory cells of one or more memory devices of the memory system based at least in part on receiving the command.

Aspect 8: The method, apparatus, or non-transitory computer-readable medium of any of aspects 1 through 7 where setting the one or more parameters of the memory system includes operations, features, circuitry, logic, means, or instructions, or any combination thereof for enabling a proportion, corresponding to the respective allocation of resources associated with the device state, of a volatile memory device of the memory system for supporting operations of the memory system based at least in part on receiving the command.

Aspect 9: The method, apparatus, or non-transitory computer-readable medium of any of aspects 1 through 8, further including operations, features, circuitry, logic, means, or instructions, or any combination thereof for transmitting an indication that the memory system has entered the device state.

Aspect 10: The method, apparatus, or non-transitory computer-readable medium of any of aspects 1 through 9 where receiving the command to enter the device state includes operations, features, circuitry, logic, means, or instructions, or any combination thereof for receiving a command, from a host system coupled with the memory system, to write an indication of the device state in a register of the memory system.

Figure 6:
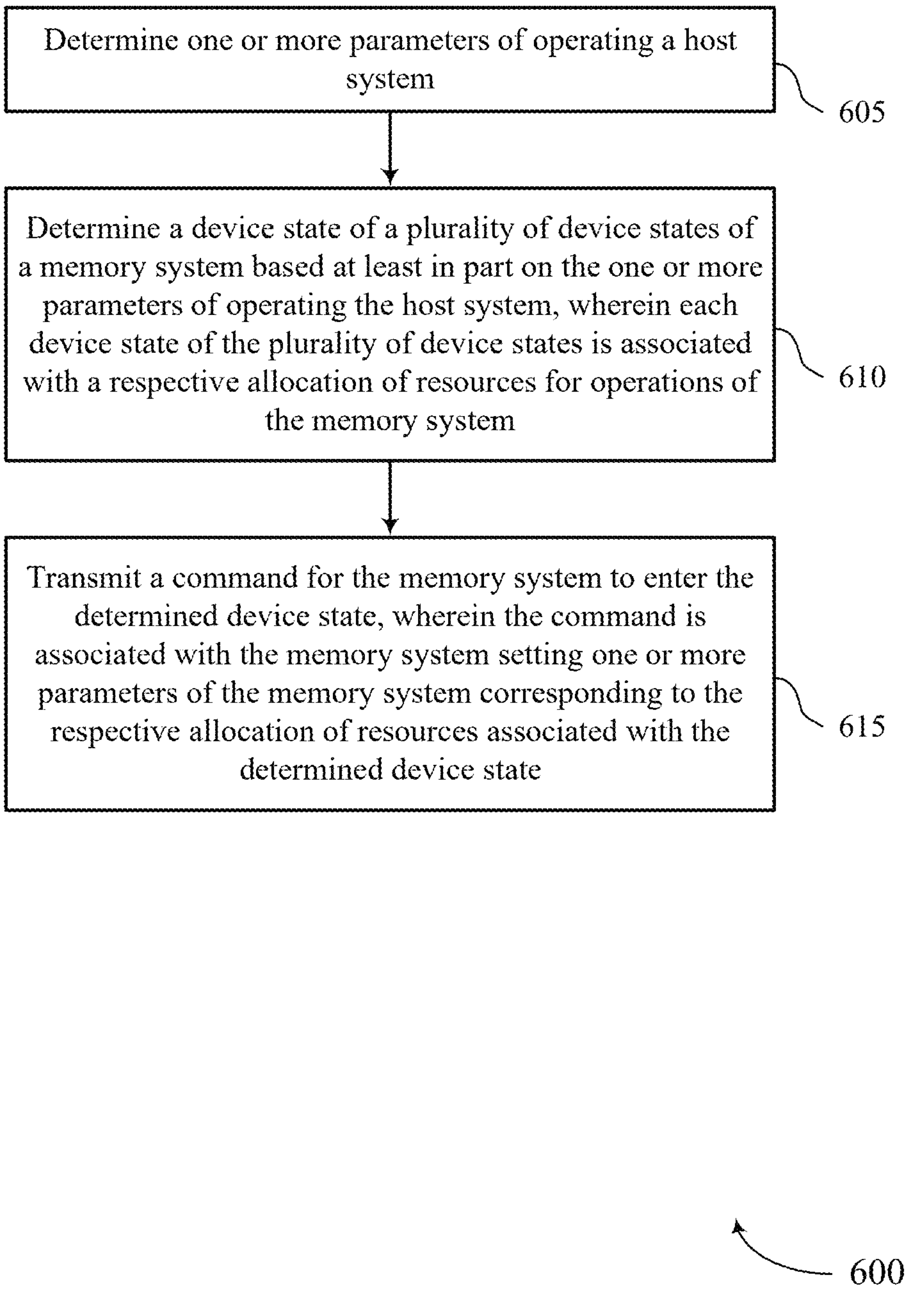

FIG. 6 shows a flowchart illustrating a method 600 that supports commanded device states for a memory system in accordance with examples as disclosed herein. The operations of method 600 may be implemented by a host system or its components as described herein. For example, the operations of method 600 may be performed by a host system as described with reference to FIGS. 1, 2, and 4. In some examples, a host system may execute a set of instructions to control the functional elements of the device to perform the described functions. Additionally, or alternatively, the host system may perform aspects of the described functions using special-purpose hardware.

At 605, the method may include determining (e.g., at a host system) one or more parameters of operating a host system. The operations of 605 may be performed in accordance with examples as disclosed herein. In some examples, aspects of the operations of 605 may be performed by a host operation evaluation component 425 as described with reference to FIG. 4.

At 610, the method may include determining (e.g., at the host system) a device state of a plurality of device states of a memory system based at least in part on the one or more parameters of operating the host system, where each device state of the plurality of device states is associated with a respective allocation of resources for operations of the memory system. The operations of 610 may be performed in accordance with examples as disclosed herein. In some examples, aspects of the operations of 610 may be performed by a memory device state determination component 430 as described with reference to FIG. 4.

At 615, the method may include transmitting a command for the memory system to enter the determined device state, where the command is associated with the memory system setting one or more parameters of the memory system corresponding to the respective allocation of resources associated with the determined device state. The operations of 615 may be performed in accordance with examples as disclosed herein. In some examples, aspects of the operations of 615 may be performed by a state command transmission component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for determining (e.g., at a host system) one or more parameters of operating a host system; determining (e.g., at the host system) a device state of a plurality of device states of a memory system based at least in part on the one or more parameters of operating the host system, where each device state of the plurality of device states is associated with a respective allocation of resources for operations of the memory system; and transmitting a command for the memory system to enter the determined device state, where the command is associated with the memory system setting one or more parameters of the memory system corresponding to the respective allocation of resources associated with the determined device state.

Aspect 12: The method, apparatus, or non-transitory computer-readable medium of aspect 11 where determining the one or more parameters of operating the host system includes operations, features, circuitry, logic, means, or instructions, or any combination thereof for determining a throughput of information associated with operating the host system.

Aspect 13: The method, apparatus, or non-transitory computer-readable medium of any of aspects 11 through 12 where determining the one or more parameters of operating the host system includes operations, features, circuitry, logic, means, or instructions, or any combination thereof for determining a latency tolerance associated with operating the host system.

Aspect 14: The method, apparatus, or non-transitory computer-readable medium of any of aspects 11 through 13 where determining the one or more parameters of operating the host system includes operations, features, circuitry, logic, means, or instructions, or any combination thereof for determining an error tolerance associated with operating the host system.

Aspect 15: The method, apparatus, or non-transitory computer-readable medium of any of aspects 11 through 14 where determining the one or more parameters of operating the host system includes operations, features, circuitry, logic, means, or instructions, or any combination thereof for determining a power condition associated with operating the host system.

Aspect 16: The method, apparatus, or non-transitory computer-readable medium of any of aspects 11 through 15 where determining the one or more parameters of operating the host system includes operations, features, circuitry, logic, means, or instructions, or any combination thereof for determining a parameter of an application associated with operating the host system.

Aspect 17: The method, apparatus, or non-transitory computer-readable medium of any of aspects 11 through 16, further including operations, features, circuitry, logic, means, or instructions, or any combination thereof for receiving an indication that the memory system has entered the device state.

Aspect 18: The method, apparatus, or non-transitory computer-readable medium of any of aspects 11 through 17 where transmitting the command to enter the device state includes operations, features, circuitry, logic, means, or instructions, or any combination thereof for transmitting a command to the memory system to write an indication of the device state in a register of the memory system.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 19: An apparatus, comprising: one or more memory devices of a memory system; and a controller of the memory system coupled with the one or more memory devices and configured to cause the apparatus to: receive a command to operate in a device state of a plurality of device states of the memory system, wherein each device state of the plurality of device states is associated with a respective allocation of resources for operations of the memory system; set one or more parameters of the memory system corresponding to the respective allocation of resources associated with the device state based at least in part on receiving the command; and perform the operations of the memory system in accordance with the respective allocation of resources associated with the device state based at least in part on setting the one or more parameters.

Aspect 20: The apparatus of aspect 19, wherein, for setting the one or more parameters of the memory system, the controller is configured to cause the apparatus to: set a quantity of logic levels, corresponding to the respective allocation of resources associated with the device state, for operating memory cells of one or more memory devices of the memory system based at least in part on receiving the command.

Aspect 21: The apparatus of any of aspects 19 through 20, wherein, for setting the one or more parameters of the memory system, the controller is configured to cause the apparatus to: enable a proportion, corresponding to the respective allocation of resources associated with the device state, of a volatile memory device of the memory system for supporting operations of the memory system based at least in part on receiving the command.

Aspect 22: The apparatus of any of aspects 19 through 21, wherein, for setting the one or more parameters of the memory system, the controller is configured to cause the apparatus to: set a degree of parallelism, corresponding to the respective allocation of resources associated with the device state, for operating one or more memory devices of the memory system based at least in part on receiving the command.

Aspect 23: The apparatus of any of aspects 19 through 22, wherein, for setting the one or more parameters of the memory system, the controller is configured to cause the apparatus to: set an error control configuration, corresponding to the respective allocation of resources associated with the device state, for operating one or more memory devices of the memory system based at least in part on receiving the command.

Aspect 24: The apparatus of any of aspects 19 through 23, wherein, for setting the one or more parameters of the memory system, the controller is configured to cause the apparatus to: set a memory management configuration, corresponding to the respective allocation of resources associated with the device state, for operating one or more memory devices of the memory system based at least in part on receiving the command.

Aspect 25: The apparatus of any of aspects 19 through 24, wherein, for setting the one or more parameters of the memory system, the controller is configured to cause the apparatus to: set a trim parameter, corresponding to the respective allocation of resources associated with the device state, for operating one or more memory devices of the memory system based at least in part on receiving the command.

Aspect 26: The apparatus of any of aspects 19 through 25, wherein, for setting the one or more parameters of the memory system, the controller is configured to cause the apparatus to: set a wear-out threshold, corresponding to the respective allocation of resources associated with the device state, for operating one or more memory devices of the memory system based at least in part on receiving the command.

Aspect 27: The apparatus of any of aspects 19 through 26, wherein the controller is further configured to cause the apparatus to: transmit an indication that the memory system has entered the device state.

Aspect 28: The apparatus of any of aspects 19 through 27, wherein, for receiving the command to enter the device state, the controller is configured to cause the apparatus to: receive a command, from a host system coupled with the memory system, to write an indication of the device state in a register of the memory system.

Another apparatus is described. The following provides an overview of aspects of the apparatus as described herein:

Aspect 29: An apparatus, comprising: a controller configured to couple with a memory system, wherein the controller is configured to cause the apparatus to: determine one or more parameters of operating the apparatus; determine a device state of a plurality of device states of a memory system based at least in part on the one or more parameters of operating the apparatus, wherein each device state of the plurality of device states is associated with a respective allocation of resources for operations of the memory system; and transmit a command for the memory system to enter the determined device state, wherein the command is associated with the memory system setting one or more parameters of the memory system corresponding to the respective allocation of resources associated with the determined device state.

Aspect 30: The apparatus of aspect 29, wherein, for determining the one or more parameters of operating the apparatus, the controller is configured to cause the apparatus to: determine a throughput of information associated with operating the apparatus.

Aspect 31: The apparatus of any of aspects 29 through 30, wherein, for determining the one or more parameters of operating the apparatus, the controller is configured to cause the apparatus to: determine a latency tolerance associated with operating the apparatus.

Aspect 32: The apparatus of any of aspects 29 through 31, wherein, for determining the one or more parameters of operating the apparatus, the controller is configured to cause the apparatus to: determine an error tolerance associated with operating the apparatus.

Aspect 33: The apparatus of any of aspects 29 through 32, wherein, for determining the one or more parameters of operating the apparatus, the controller is configured to cause the apparatus to: determine a power condition associated with operating the apparatus.

Aspect 34: The apparatus of any of aspects 29 through 33, wherein, for determining the one or more parameters of operating the apparatus, the controller is configured to cause the apparatus to: determine a parameter of an application associated with operating the apparatus.

Aspect 35: The apparatus of any of aspects 29 through 34, wherein the controller is further configured to cause the apparatus to: receive an indication that the memory system has entered the device state.

Aspect 36: The apparatus of any of aspects 29 through 35, wherein, for transmitting the command to enter the device stat, the controller is configured to cause the apparatus to: transmit a command to the memory system to write an indication of the device state in a register of the memory system.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended FIGURES, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

receive a command that indicates the memory system to write a value indicative of a target device state to a register of the memory system, wherein the target device state is one of a plurality of device states supported by the memory system;

set a plurality of memory operation parameters in accordance with a respective allocation of resources corresponding to the target device state based at least in part on reading the value of the register;

transmit an indication that the memory system has entered the target device state based at least in part on setting the plurality of memory operation parameters; and perform one or more operations of the memory system in accordance with the target device state based at least in part on setting the plurality of memory operation parameters.

2. The memory system of claim 1, wherein, to set the plurality of memory operation parameters, the processing circuitry is configured to cause the memory system to:

set a degree of parallelism for operating the one or more memory devices; and set a proportion of a volatile memory of the one or more memory devices for supporting the one or more operations.

3. The memory system of claim 2, wherein, to set the degree of parallelism, the processing circuitry is configured to cause the memory system to:

set a quantity of data paths that operate concurrently, set a quantity of memory devices of the one or more memory devices that operate concurrently, or a combination thereof.

4. The memory system of claim 1, wherein, to set the plurality of memory operation parameters, the processing circuitry is configured to cause the memory system to:

set a quantity of logic levels for operating memory cells of the one or more memory devices; and set an error control configuration for operating the one or more memory devices.

5. The memory system of claim 4, wherein the error control configuration comprises an indication of whether error control operations of the memory system are enabled, a quantity of bits associated with error detection operations, a quantity of bits associated with error correction operations, an indication of whether a redundant array of independent not-AND (RAIN) is activated, or any combination thereof.

6. The memory system of claim 1, wherein, to set the plurality of memory operation parameters, the processing circuitry is configured to cause the memory system to:

set a memory management configuration for operating the one or more memory devices; and set a wear-out threshold for operating the one or more memory devices.

7. The memory system of claim 6, wherein the memory management configuration comprises an indication of whether memory management operations of the memory system are operational or inhibited, a rate at which memory management operations are performed, or both.

8. The memory system of claim 1, wherein, to set the plurality of memory operation parameters, the processing circuitry is configured to cause the memory system to:

set one or more trim parameters for operating the one or more memory devices; and set a proportion of a volatile memory of the one or more memory devices for supporting the one or more operations.

9. The memory system of claim 8, wherein the one or more trim parameters comprise a clock timing parameter, a clock scaling parameter, an access operation timing parameter, a read signal magnitude parameter, a write signal magnitude parameter, a burst configuration parameter, or any combination thereof.

10. The memory system of claim 1, wherein, to set the plurality of memory operation parameters, the processing circuitry is configured to cause the memory system to:

set a degree of parallelism for operating the one or more memory devices; and set a memory management configuration for operating the one or more memory devices.

11. The memory system of claim 1, wherein, to set the plurality of memory operation parameters, the processing circuitry is configured to cause the memory system to:

set a wear-out threshold for operating the one or more memory devices; and set a proportion of a volatile memory of the one or more memory devices for supporting the one or more operations.

12. A memory system, comprising:

one or more memory devices; and processing circuitry coupled with the one or more memory devices and configured to cause the memory system to:

receive, at the memory system, a command to operate the memory system in a target device state of a plurality of device states of the memory system, wherein each device state of the plurality of device states corresponds to a respective allocation of resources for operations of the memory system;

transmit, from the memory system in response to the command, an indication that the memory system has entered the target device state based at least in part on setting a combination of multiple parameters associated with the respective allocation of resources corresponding to the target device state; and perform one or more operations of the memory system in accordance with the respective allocation of resources corresponding to the target device state based at least in part on transmitting the indication.

13. The memory system of claim 12, wherein, to set the combination of multiple parameters, the processing circuitry is configured to cause the memory system to:

set a degree of parallelism for operating the one or more memory devices; and set a proportion of a volatile memory of the one or more memory devices for supporting the one or more operations.

14. The memory system of claim 13, wherein, to set the degree of parallelism, the processing circuitry is configured to cause the memory system to:

enable a quantity of data paths that operate concurrently, enable a quantity of memory devices of the one or more memory devices that operate concurrently, or a combination thereof.

15. The memory system of claim 12, wherein, to set the combination of multiple parameters, the processing circuitry is configured to cause the memory system to:

set a quantity of logic levels for operating memory cells of the one or more memory devices; and set an error control configuration for operating the one or more memory devices.

16. The memory system of claim 15, wherein the error control configuration comprises an indication of whether error control operations of the memory system are enabled, a quantity of bits associated with error detection operations, a quantity of bits associated with error correction operations, an indication of whether a redundant array of independent not-AND (RAIN) is activated, or any combination thereof.

17. The memory system of claim 12, wherein, to set the combination of multiple parameters, the processing circuitry is configured to cause the memory system to:

set a memory management configuration for operating the one or more memory devices; and set a wear-out threshold for operating the one or more memory devices.

18. The memory system of claim 12, wherein, to set the combination of multiple parameters, the processing circuitry is configured to cause the memory system to:

set one or more trim parameters for operating the one or more memory devices; and set a proportion of a volatile memory of the one or more memory devices for supporting the one or more operations.

19. The memory system of claim 12, wherein, to set the combination of multiple parameters, the processing circuitry is configured to cause the memory system to:

set a degree of parallelism for operating the one or more memory devices; and set a memory management configuration for operating the one or more memory devices.

20. The memory system of claim 12, wherein, to set the combination of multiple parameters, the processing circuitry is configured to cause the memory system to:

set a wear-out threshold for operating the one or more memory devices; and set a proportion of a volatile memory of the one or more memory devices for supporting the one or more operations.

* * * * *